United States Patent [19]
Tidd

[11] 3,868,225
[45] Feb. 25, 1975

[54] SODIUM CHLORATE OXYGEN PRODUCING APPARATUS

[75] Inventor: Arthus H. Tidd, Hollywood, Fla.

[73] Assignee: Safety Laboratories, Inc., Miami, Fla.

[22] Filed: May 25, 1973

[21] Appl. No.: 363,932

[52] U.S. Cl.................. 23/281, 423/579, 252/186, 102/101, 128/203
[51] Int. Cl.............................................. B01j 7/00
[58] Field of Search....... 23/281; 423/579; 102/100, 102/101; 128/203

[56] References Cited
UNITED STATES PATENTS

| | | | |
|---|---|---|---|
| 2,558,756 | 7/1951 | Jackson et al. | 23/281 |
| 3,608,026 | 9/1971 | Isakssora | 264/DIG. 50 |
| 3,615,251 | 10/1951 | Klenk | 23/281 |
| 3,620,683 | 11/1971 | Hwoschinsky et al. | 23/281 |
| 3,736,104 | 5/1973 | Churchill et al. | 23/281 |

Primary Examiner—James H. Tayman, Jr.
Attorney, Agent, or Firm—Ladas, Parry, Von Gehr, Goldsmith & Deschamps

[57] ABSTRACT

A sodium chlorate oxygen producing apparatus in which sodium chlorate candle is mounted in a sodium chlorate candle container and is supported therein by gas permeable thermally insulating material disposed around the candle, an ignition device is attached to the candle container and is adapted upon operation to ignite the sodium chlorate candle to produce oxygen for exit through an outlet passage, and a catalytic means is disposed in the path of oxygen to eliminate substantially all carbon monoxide and carbon dioxide from that oxygen, the sodium chlorate candle having first, second and third zones of different compositions in order from the point of ignition by the ignition device, the first zone being a rapidly burning flash composition comprising sodium chlorate, iron, barium peroxide and boron, said second zone being a more slowly burning cone composition comprising sodium chlorate, iron, barium peroxide, asbestos and a quantity of said flash composition, and said third zone being the slowest burning composition of the three zones, forming the main body of the candle and comprising sodium chlorate, iron, barium peroxide and glass powder, said sodium chlorate candle also having a booster compositoin layer disposed between an adjacent pair of said zones, said booster composition comprising at least iron and barium peroxide and having a rate of burning intermediate the rates of burning of said adjacent layers thereby to ensure an adequate transition of combustion from the faster burning to the slower burning of said adjacent zones.

13 Claims, 3 Drawing Figures

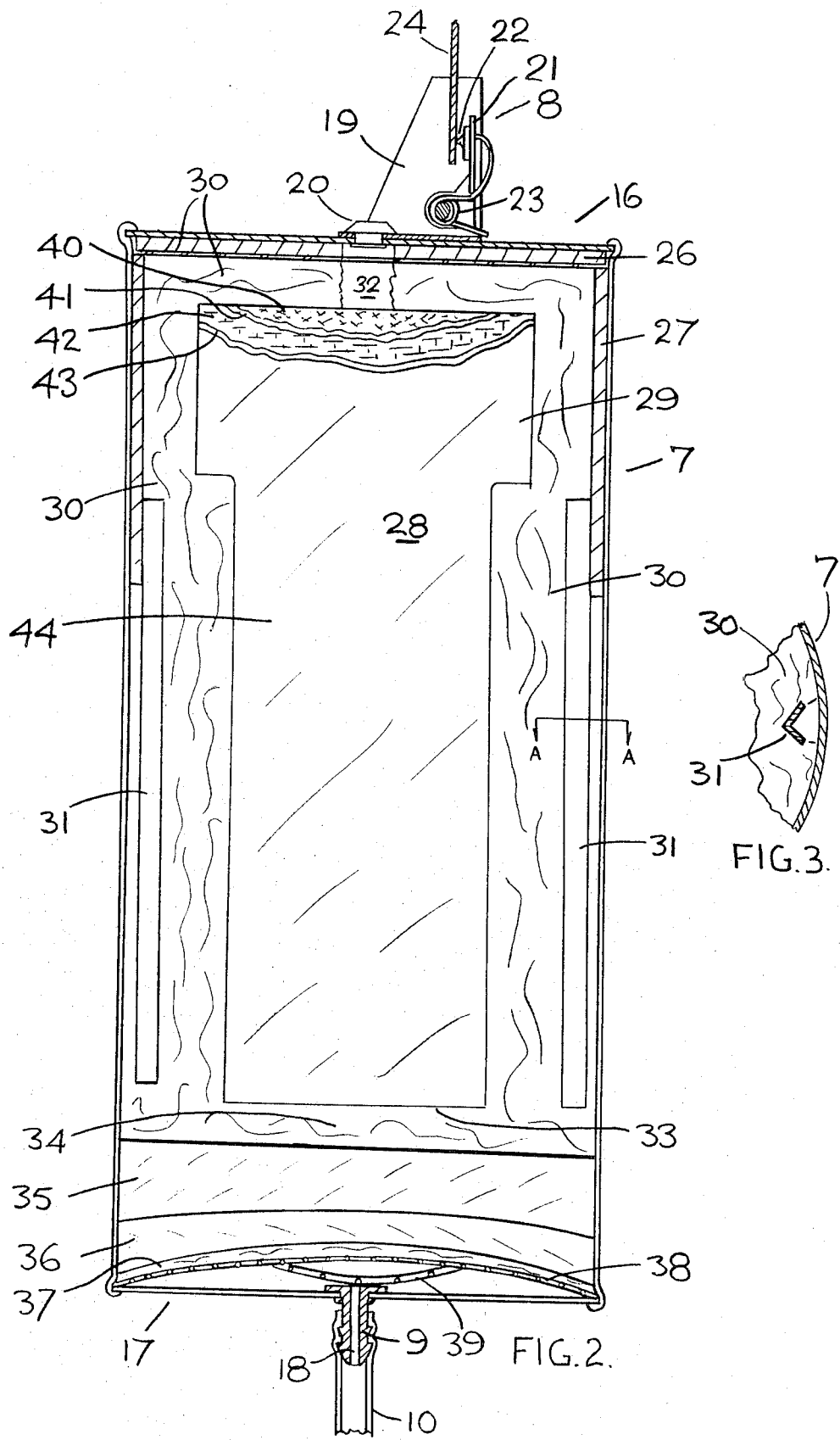

SODIUM CHLORATE OXYGEN PRODUCING APPARATUS

This invention relates to a portable sodium chlorate oxygen producing apparatus and particularly, though not exclusively, to such an apparatus for emergency use.

Oxygen production by thermal decomposition of alkali metal chlorates has been known for many decades. Practical application of this principle dates from before World War II, when attempts were made to utilize such chlorates as a source of aviators' breathing oxygen. The oxygen so produced did not fully meet desired purity standards, however, this early work did highlight the basic advantage of chemically generating oxygen using solidified chlorates, the specific advantage being compactness, ease of handling, and long term stability.

The art of producing oxygen from sodium chlorate has been developed to an extent where a reliable source of oxygen can be provided. It has been proposed in the prior art to utilize a sodium chlorate candle comprising a flash mix followed by a rapid burning cone followed by the main body of the candle in the form of a mixture of sodium chlorate, iron and a barium peroxide, the flash mix and cone being designed to establish a sufficient heat of combustion to properly and sufficiently ignite the main body of the candle. These prior art devices have, however, suffered from problems involved in the transition of combustion from the flash mix to the cone and from the cone to the main body with the result that during this transition a substantial drop in oxygen production is exhibited by these devices.

It is an object of the present invention to produce an apparatus capable of supplying physiologically acceptable oxygen (complying, except for water vapor content, with the requirements of the United States Pharmacopaeia) at a rate of 6 liters per minute or greater for a period exceeding 15 minutes.

It is a further object of this invention to overcome the problems relating to transition of combustion from one zone to another of a sodium chlorate candle, thereby to reduce or eliminate dips in the rate of oxygen supply at the time of transition.

It is a further object of the present invention to provide a convenient, portable, compact, self-contained oxygen producing apparatus of low cost, having a long shelflife and very high reliability.

According to the present invention there is provided a sodium chlorate oxygen producing apparatus comprising a sodium chlorate candle container, a sodium chlorate candle housed and supported within the candle container, a gas permeable thermally insulating material disposed around the candle and supporting the candle in spaced relationship with the walls of the candle container, an ignition device attached to the candle container and adapted upon operation to ignite the sodium chlorate candle, an outlet passage means for permitting exit of oxygen from the candle container, and means disposed in the path of oxygen, generated by the sodium chlorate candle following ignition, to eliminate substantially all carbon monoxide and carbon dioxide from that oxygen, the sodium chlorate candle having first, second and third zones, in order from the point of ignition by the ignition device, each zone being of a different composition, said first zone being a rapidly burning flash composition comprising sodium chlorate, iron, barium peroxide and boron, said second zone being a more slowly burning cone composition comprising sodium chlorate, iron, barium peroxide, an inert filler and a quantity of said flash composition, and said third zone being the slowest burning composition of the three zones, forming the main body of the candle and comprising sodium chlorate, iron, barium peroxide and an inert filler, said sodium chlorate candle also having a booster composition layer disposed between an adjacent pair of said zones, said booster composition comprising at least iron and barium peroxide and having a rate of burning intermediate the rates of burning of said adjacent layers thereby to ensure an adequate transition of combustion from the faster burning to the slower burning of said adjacent zones.

According to a preferred form of the present invention there is provided a sodium chlorate oxygen producing apparatus comprising a sodium chlorate candle container, a sodium chlorate candle housed and supported within the candle container, a gas permeable thermally insulating material disposed around the candle and supporting the candle in spaced relationship with the walls of the candle container, an ignition device attached to the candle container and adapted, upon operation, to ignite the sodium chlorate candle, an outlet passage means for permitting exit of oxygen from the candle container and means disposed in the path of oxygen generated by the sodium chlorate candle following ignition to eliminate substantially all carbon monoxide and carbon dioxide from that oxygen, the sodium chlorate candle comprising first, second, third, fourth and fifth different compositions arranged in layers in order from the point of ignition by the ignition means, said first composition being a rapdily burning flash composition comprising sodium chlorate, iron, barium peroxide and boron, the second composition being a slower burning booster composition comprising iron and barium peroxide, the third composition comprising a more slowly burning cone composition comprising sodium chlorate, iron, barium peroxide, an inert filler and a quantity of said flash composition, the fourth composition being an even more slowly burning booster composition comprising sodium chlorate, iron, barium peroxide and an inert filler, and the fifth composition being the slowest burning of the five compositions, forming the main body of the candle and comprising sodium chlorate, iron, barium peroxide and an inert filler, the fifth composition differing from the fourth composition by including a greater percentage by weight of sodium chlorate.

In a particularly preferred embodiment the five compositions having constituents given as % by weight as follows:

said flash composition
 about 69½ to 70½ $NaClO_3$
 about 9½ to 10½ Fe
 about 9½ to 10½ $BaO_2$
 about 9½ to 10½ Boron;
said slower burning booster composition
 about 45 to 55 Fe
 about 45 to 55 $BaO_2$;
said cone composition comprising an intermediate composition having
 about 36½ to 37½ $NaClO_3$
 about 36½ to 37½ Fe
 about 3½ to 4½ $BaO_2$
 21½ to 22½ asbestos into which is mixed as a % by weight of said intermediate composition 5¾% to 6¾% of said flash composition;

said even more slowly burning booster composition
- about 64 to 65 $NaClO_3$
- about 18 to 19 Fe
- about 16 to 17 $BaO_2$
- about ¼ to 1¼ glass powder; and said main body composition
- about 90 to 91 $NaClO_3$
- about 4 to 5 Fe
- about 4 to 5 $BaO_2$
- about 0 to 1 glass powder.

The present invention offers advantage over the prior art by virtue of the use of the five different compositions to form the sodium chlorate candle, thereby permitting the use of a minimum amount of flash composition and complete and adequate ignition of each subsequent composition as combustion proceeds following ignition with a consequent reduction or elimination of substantial dips in oxygen production during transition of combustion from flash composition to the cone composition and from the cone composition to the composition of the main body of the candle.

As used in this specification the term "inert filler" shall be construed as referring to an inert filler which will not vaporize at the temperatures to which it is subjected during the combustion process of the sodium chlorate candle.

A specific embodiment of the present invention will now be described, by way of example, with reference to the accompanying drawings in which:

FIG. 2 is a sectional elevation along the longitudinal axis of a candle container forming a part of the arrangement shown in FIG. 1; and FIG. 3 is a fragmentary sectional plan along section lines A—A of FIG. 2.

Figure 1:
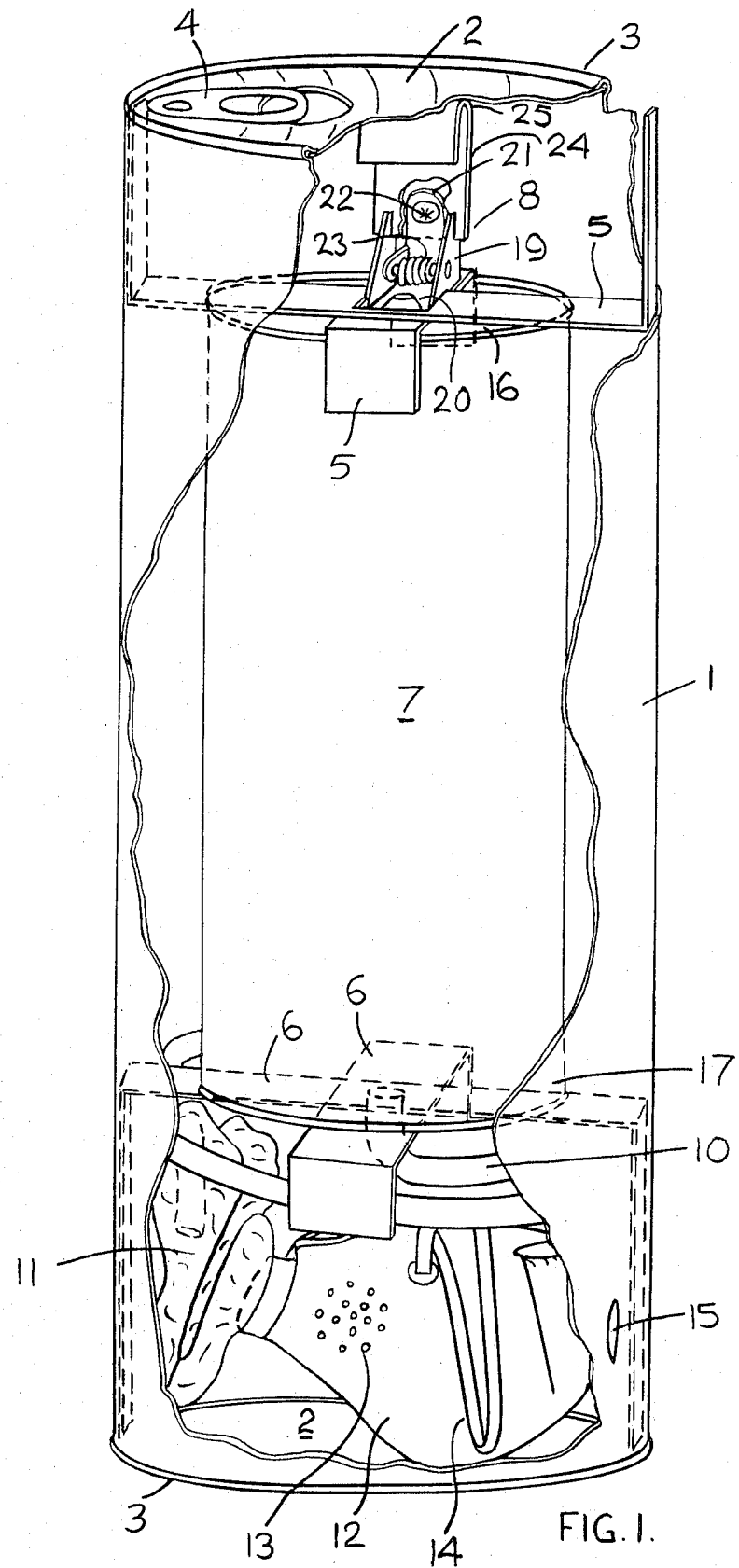
FIG. 1 is a partially cut-away perspective view of the embodiment shown in its closed (storage) condition.

Referring first to FIG. 1 in which there is shown an outer canister 1 of elongate cylindrical form closed at each end by a tear-off cover 2. The end covers are held in place by a rolled over edge 3 forming part of the main body of the canister and, prior to opening, the canister is hermetically sealed by virtue of the use of sealing material well known to those skilled in the art and placed between the main body of the canister and each cover 2. In this specific embodiment the main body of the canister is constructed of tin plated steel having a longitudinally extending hermetically sealed rolled joint and the end covers are constructed of aluminum. Each end cover 2 is provided with a pull tab 4 normally laying substantially flush with the surface of the end cover, by means of which the end cover can be removed from the canister.

Suspended within the canister by means of two pairs of brackets 5 and 6 is a candle container 7. Each pair of brackets 5 and 6 comprises two U-shaped brackets secured together by spot welds in a cross-configuration. One of the brackets of the pair of brackets 5 extends across the full diameter of the interior of the container and has longitudinally extending leg portions to locate the candle container 7 centrally within the canister a fixed distance from the adjacent end cover of the canister. The other bracket of the pair of brackets 5 extends across the diameter of the candle container 7 and has leg portions extending a short distance longitudinally along the candle container 7 to locate the candle container in relation to the brackets thereby to position the candle container centrally within the canister. The pair of brackets 5 has a rectangular opening located centrally therein through which projects a candle igniting mechanism 8.

The pair of brackets 6 comprise two U-shaped brackets spot welded together in a crossed-configuration with both brackets extending across the full diameter of the canister and with the legs of both brackets extending longitudinally along the inner periphery of the main body of the canister, one of the brackets having legs extending to the adjacent end cover of the canister to longitudinally locate the candle container 7 in relation to the canister. The pair of brackets 6 have a centrally located circular opening through which a nipple 9 mounted in the center of the adjacent end of the candle container 7 projects to locate the candle container 7 centrally in relation to the pair of brackets 6 and consequently in relation to the main body of the canister 1.

Between the crossed portions of the pair of brackets 6 and the adjacent end cover 2 of the canister is housed a length of polythene tubing extending from the nipple 9 to a breathing bladder 11 and a polythene face mask 12 connected to an outlet from the bladder 11. The face mask has vent holes 13 and an elastic strap 14 by means of which the face mask can be attached to a recipient for oxygen to be supplied by the apparatus.

The outer canister is supplied with two pressure relief panels 15 (one only being shown) which have weakened peripheries of a nature which will permit the panel to be blown from the canister in the event that the canister becomes pressurized above a desired safe level.

The candle container 7 is an elongate cylindrical container, constructed of tin plated steel with rolled joints (which are not soldered or sealed), having a diameter of 2⅝ inches and a length of 7 inches. Mounted on one end 16 of the container is the candle igniting mechanism 8 and centrally mounted on the other end 17 of the container is nipple 9. The nipple 9 provides communication between the interior and exterior of the container by way of a passage 18. The tubing 10 is connected to the nipple 9 for communication with the passage 18.

Referring now to FIGS. 1 and 2, the igniting mechanism 8 comprises a U-shaped bracket 19 attached centrally to the one end 16 of the container by means of a percussion cap 20. Pivotally mounted in the U-shaped bracket 19 is a striker 21 having a substantially pointed nose 22 and being spring biased by a coil spring 23 acting between the U-shaped bracket 19 and the striker 21 to bias said striker 21 toward cooperation with the percussion cap 20. The striker 21 prior to use is retained against movement under the influence of the coil spring by a trigger plate 24 (only part of which is shown in FIG. 2 and which is shown in FIG. 1 with a portion cut away to show detail of the striker 21). The trigger plate 24 has a curved portion 25 and is removed by sliding motion along the U-shaped bracket away from the one end 16 of the container 7. The trigger plate is of sufficient length to engage the interior of the cover 2 adjacent to the trigger plate thereby to prevent accidental removal of the trigger plate, with the consequent release of the striker, prior to removal of that cover 2. Upon removal of the last mentioned cover 2, the trigger plate can be pulled away from the igniting mechanism with the consequent release of the striker 21, which then under the influence of the spring 23 will strike the percussion cap and cause the explosion of the explosive housed within the percussion cap.

Immediately adjacent the one end 16 inside the container 7 is a copper disc 26 of substantially the same diameter as the interior of the container 7, having a central hole nine thirty-seconds of an inch in diameter communicating with the percussion cap and having a thickness of .020 inch. Adjacent the copper disc 26 is a longitudinally extending tubular copper sheet 27 of an outside diameter to fit closely within the inner periphery of the container 7, approximately 2 inches long and having a thickness of .020 inch.

Coaxially mounted on the longitudinal axis of the container 7 is a sodium chlorate candle 28 of substantially circular cross-section and having a portion 29 of increased diameter adjacent the one end 16. The candle 28 is supported in fixed spaced relationship with the container 7 by glass fiber thermal insulating material 30. Longitudinally extending and symmetrically arranged around the inner periphery of the container 7 are four sheet metal duct members 31 (two only being shown). The duct members are of right angle section with one-fourth inch sides and with the open face of the angle facing the wall of the container 7. The duct members 31 provide for circulation of hot gases within the container during combustion of the candle to tend to equalize temperatures within the container and to preheat the still unburnt portion of the candle.

Between the opening formed centrally in the copper disc 26 and most adjacent surface of the candle 28 extends a passage 32 formed centrally in the glass fiber insulation material 30. This passage 32 provides for communication of the heat and forces generated by the explosion of the explosive in the percussion cap 20 to the candle 29 for the purposes of igniting that candle.

Between the end of the candle 33 remote from the one end 16, and the other end 17 of the container 7 there are a plurality of layers of material in the following order from the end 33 of the candle to the other end 17: a layer of glass fiber 34, a layer of catalytic material 35 known by the trade name "Hopcalite," a layer of sodium hydroxide 36, a layer of glass fiber insulating material 37 and a particle filter screen in the form of a 20-gauge mesh 38. The 20-gauge mesh 38 is of concave form to leave a space between the mesh and the other end 17 thereby to provide a small cavity extending over the entire diameter of the container 7 and communicating with the passage 18 of the nipple 9. The mesh is supported in spaced relationship with the other end 17 by a courser and relatively rigid piece of mesh material 39.

The sodium chlorate candle 28 is of a solid generally cylindrical form approximately 6 inches long with a diameter of the main portion of the candle of approximately 1¾ inches. The end portion 29 of the candle is approximately 2¼ inches diameter and five-eighths of an inch long. The five-eighths inch dimension may be varied by plus or minus one-eighth of an inch while the other dimensions of the candle may be varied by plus or minus about 20%.

The candle comprises five different compositions, each located in a particular zone of the candle. Adjacent the percussion cap and at the outer end face of the end 29 of the candle there is a quantity of flash composition 40. This composition does not extend to the periphery of the candle and is concentrated towards the central axis of the candle. Immediately under the flash composition 40 is a layer of booster composition 41 which is disposed between the flash composition 40 and a cone composition 42. The cone composition 42 is separated from the main body composition 44 of the candle by a layer of a different booster composition 43.

The compositions 40, 41, 42, 43 and 44 are in quantities and have constituents as follows:

2 – 3 grams of flash composition 40 (excluding the 0.7 grams of flash composition referred to below) comprising, by weight:
  70% $NaClO_3$
  10% Fe
  10% $BaO_2$
  10% Boron;

2 grams of the booster composition 41, comprising, by weight:
  50% Fe
  50% $BaO_2$;

12 grams of the cone composition 42, comprising 11.3 grams of an intermediate composition having by weight:
  37% $NaClO_3$
  37% Fe
  4% $BaO_2$
  22% asbestos (or e.g., particles of glass fiber, glass frit of 10 to 20 mesh)
into which intermediate composition is added and mixed 0.7 grams of the flash composition as defined above and then is added and mixed 2% water;

10 grams of booster composition 43, comprising, by weight:
  64.4% $NaClO_3$
  18.4% Fe
  16.4% $BaO_2$
  0.7% glass powder (purified silica
    (or e.g., particles of
    glass fiber);

460 grams of main body composition 44, comprising, by weight:
  90.5% $NaClO_3$
  4.5% Fe
  4.5% $BaO_2$
  0.5% glass powder (purified silica)
    (or e.g., particles of
    glass fiber)

The materials used in the compositions have particle sizes as follows:
  $NaClO_3$ — 20 mesh or smaller
  Fe — finely divided (typically 400 mesh)
  $BaO_2$ — finely divided (typically 400 mesh)
  Boron — very finely divided (smaller than 400 mesh)
  Asbestos — very finely divided
  Glass powder — finely divided (300 – 500 mesh).

The candle 28 is formed by molding and compacting into the shape described above and shown in FIG. 2 with the various compositions contained therein distributed as shown and described. The molding and compacting is achieved with the use of a resilient rubber bag the interior shape of which corresponds to the desired shape of the finished candle. The compositions are placed in the rubber bag in desired relationship to one another and during this process the main body composition is first placed in the bag to occupy the desired part of the bag. Following this step the compositions 43, 42, 41 and 40 are placed in order to form layers of the compositions as shown in FIG. 2.

During this part of the construction of the candle the booster composition 43 is caused to be in intimate contact with the composition of the main body at the interface therebetween and some intermingling of the two compositions at that interface is caused to occur. This intermingling is achieved by producing a roughened surface in the main body and gently working and pressing the booster composition into this roughened surface. A similar relationship between the interfaces of the flash composition 40 and booster composition 41, the booster composition 41 and the cone composition 42, and the cone composition 42 and the booster composition 43 is produced. Prior to adding the compositions 40, 41, 42 and 43, 1% by weight of water is added to the mix of the main body of the candle.

After the candle is molded into shape it is compacted, in the rubber bag, in an isostatic press at a pressure of between 3,000 and 5,000 lb./sq. inch. Following this compaction the rubber bag is removed from the candle and the candle is baked in an oven for a period sufficient to remove substantially all water from the candle.

The layer of "Hopcalite" used in the candle container 7 is a mixture of oxides of copper, cobalt, manganese and silver, and forms a catalyzer for converting carbon monoxide into carbon dioxide.

The sodium hydroxide layer is used to convert carbon dioxide flowing therethrough to produce sodium carbonate.

The primary use of the apparatus hereinbefore specifically described is as an emergency source of oxygen capable of supplying oxygen in accordance with the requirements of the United States Pharmacopaeia, except for quantity of water vapor, at substantially constant rate of at least 6 liters per minute for a time exceeding 15 minutes. When the supply of oxygen is required, both covers 2 are removed from the outer canister and the face mask 12, breathing bladder 11 and tubing 10 are removed from the canister with the end of the tubing 10 left connected to the nipple 9. The trigger plate is then pulled free to permit the striker 21 under the influence of the coil spring 23 to strike the percussion cap thereby to explode the explosive in the percussion cap. The energy of this explosion is transmitted by way of the hole in the center of the copper disc 26 and the passage 32 in the glass fiber insulation 30 to the flash composition located at the end of the candle 28. This heat energy ignites the flash compositions which burns very rapidly and which produces sufficient heat and temperature to ignite the adjacent surface material of the cone composition 42. Booster composition 41 disposed between the flash composition and the cone composition burns less rapidly than the flash composition and more rapidly than the cone composition and acts to ensure that the cone composition is completely and adequately ignited, thereby to ensure a smooth transition of combustion from the flash composition to the cone composition.

The cone composition burns for approximately 25 to 35 seconds and serves to provide sufficient heat and temperature to ignite the main body composition 44 of the candle. The booster composition 43 between the cone composition and the main body composition is slower burning than the cone composition and faster burning than the main body composition. This booster composition 43 serves to ensure that the main body composition 44 of the candle is completely and adequately ignited, thereby to provide a smooth transition of combustion from the cone composition to the main body composition. After ignition of the main body composition, the main body composition burns progressively from one end to the other for a period sufficient to ensure supply of the required amount of oxygen.

The barium peroxide ($BaO_2$) in the various mixes serves as a getter material to remove free chlorine from the liberated oxygen. The oxygen leaving the candle contains carbon dioxide, carbon monoxide and water vapor. This contaminated oxygen passes, by way of the glass fiber insulation material, to the passage 18 and tubing 10, by way of the nipple 9, through the "Hopcalite" in which the carbon monoxide is converted into carbon dioxide and subsequently through the sodium hydroxide in which the carbon dioxide is eliminated in favor of the production of sodium carbonate. As a final step before the oxygen passes into the passage 18 of the nipple 9 the oxygen is filtered through a layer of glass fiber and a twenty gauge mesh screen to remove any particles carried this far through the process. The oxygen supplied to the face mask is physiologically acceptable and contains a certain amount of water vapor.

The temperature of combustion of the candle is in the region of 700° Fahrenheit and approximately 1,000 Btu's per pound of oxygen are produced by the combustion process. The candle is thermally insulated by the glass fiber with which it is surrounded and the outer canister is further insulated from the heat of combustion by the annular air space existing between the candle container and the outer canister. In use, it is to be preferred that the outer canister is laid with its longitudinal axis substantially horizontal in order to permit free circulation of air between the outer canister and the candle container to assist in dissipation of heat. The outer surface of the outer canister is coated electrostatically with a synthetic fiber floc which is held on to the canister by means of a suitable adhesive. This floc coating further serves to thermally insulate the user of the device from the heat generated during production of oxygen by the candle. The copper disc 26 and sheet 27 partially surround the area of highest combustion temperatures and heat production to act as heat sinks and to assist in heat dissipation.

The apparatus of this invention is disposable and following use may be disposed of in any convenient manner.

I claim:

1. A sodium chlorate oxygen producing apparatus comprising:
    a sodium chlorate candle container,
    a sodium chlorate candle of generally elongate cylindrical form housed and supported within the candle container,
    a gas permeable thermally insulating material disposed around the candle and supporting the candle in spaced relationship with the walls of the candle container,
    an ignition device attached to the candle container and adapted, upon operation, to ignite the sodium chlorate candle,
    an outlet passage means for permitting exit of oxygen from the candle container, and means disposed in the path of oxygen generated by the sodium chlorate candle following ignition to eliminate substantially all carbon monoxide and carbon dioxide from that oxygen, the sodium chlorate candle comprising first, second, third, fourth and fifth different compositions arranged in order longitudinally along the candle from the point of ignition by the ignition means, said first composition being a rapidly burning flash composition having constituents given as % by weight as follows;
about 69½ to 70½ NaClO$_3$
about 9½ to 10½ Fe
about 9½ to 10½ BaO$_2$
9½ to 10½ Boron;

said second composition being a slower burning booster composition having constituents given as % by weight as follows;
about 45 to 55 Fe
about 45 to 55 BaO$_2$;

said third composition being a more slowly burning cone composition having constituents given as % by weight as follows;
an intermediate composition having
about 36½ to 37½ NaClO$_3$
about 36½ to 37½ Fe
about 3½ to 4½ BaO$_2$
about 21½ to 22½ inert filler
into which is mixed as a % by weight of said intermediate composition about 5¾% to 6¾% of said flash composition;

said fourth composition being an even more slowly burning booster composition having constituents given as % by weight as follows;
about 64 to 65 NaClO$_3$
about 18 to 19 Fe
about 16 to 17 BaO$_2$
about ¼ to 1¼ inert filler; and said fifth composition being the slowest burning of the five compositions, forming the main body and having constituents given as % by weight as follows;
about 90 to 91 NaClO$_3$
about 4 to 5 Fe
about 4 to 5 BaO$_2$
about 0 to 1 inert filler.

2. Apparatus according to claim 1, wherein the candle comprises about 2 to 3 grams of said flash composition, about 2 grams of said slower burning booster composition, about 12 grams of said cone composition, about 10 grams of said even more slowly burning booster composition and about 460 grams of said main body composition.

3. Apparatus according to claim 1, wherein the generally elongate cylindrical form includes a portion of increased diameter adjacent said ignition point and extending longitudinally past said first, second, third and fourth compositions.

4. An apparatus according to claim 3, wherein the inert filler of the cone composition is asbestos, the inert filler of the even more slowly burning booster composition and of the main body composition is glass powder and wherein said five compositions have constituents by weight as follows:
said flash composition,
70% NaClO$_3$
10% Fe
10% BaO$_2$
10% Boron;
said slower burning booster composition,
50% Fe
50% BaO$_2$;
said cone composition, an intermediate composition having
37% NaClO$_3$
37% Fe
4% BaO$_2$
22% asbestos
into which is mixed as a % by weight of the intermediate composition approximately 6% of said flash composition and 2% water;
said even more slowly burning booster composition,
64.4% NaClO$_3$
18.4% Fe
16.4% BaO$_2$
0.7% glass powder; and
said main body composition,
90.5% NaClO$_3$
4.5% Fe
4.5% BaO$_2$
0.5% glass powder.

5. Apparatus according to claim 1 wherein the materials used in said compositions have particle sizes as follows:
Sodium Chlorate — At least as small as 20 mesh
Iron — Finely divided
Barium Peroxide — Finely divided
Boron — Very finely divided
Asbestos — Very finely divided
Glass Powder — Finely divided.

6. Apparatus according to claim 1, wherein the candle is from about 4.8 to about 7.2 inches long, from about 1½ to about 2 inches diameter except at the portion of increased diameter, from about 1⅞ to about 2⅝ inches diameter in the portion of increased diameter and said portion of increased diameter being from about one-half to about three-fourths inch long.

7. Apparatus according to claim 1, wherein said first composition is disposed at said ignition point in a layer of increasing thickness along a radial line inwardly toward the longitudinal axis of said candle.

8. Apparatus according to claim 1, further comprising an outer canister, concentrically surrounding in fixed spaced relationship said candle container, including a tubular wall portion and tear out end closures, said closures hermetically sealing said wall portion at its ends, and being arranged for easy removal when said apparatus is to be used to produce oxygen.

9. Apparatus according to claim 8, wherein said ignition means is inoperable until one of said end closures is removed and wherein the other of said end closures, said wall portion and said candle container define a face mask, breathing bladder and oxygen supply tubing storage chamber.

10. Apparatus according to claim 9, further comprising a face mask, a breathing bladder connected to said mask and an oxygen supply tubing, connecting said bladder to said candle container outlet passage means, all adapted for storage in said storage chamber.

11. Apparatus according to claim 1, wherein said means for eliminating carbon monoxide and carbon dioxide is disposed in said candle container between said candle and said outlet passage means and further comprising a particle filter means disposed between said catalytic means and said outlet passage means.

12. Apparatus according to claim 1, wherein said means for eliminating carbon monoxide and carbon dioxide from said oxygen includes,
 a first means for converting carbon monoxide to carbon dioxide, and
 a second means for removing carbon dioxide.

13. Apparatus according to claim 1, wherein the materials used in said compositions have particle sizes as follows:
 Sodium Chlorate — At least as small as 20 mesh,
 Iron — Finely divided
 Barium Peroxide — Finely Divided
 Boron — Very finely divided

* * * * *